Figure 1:
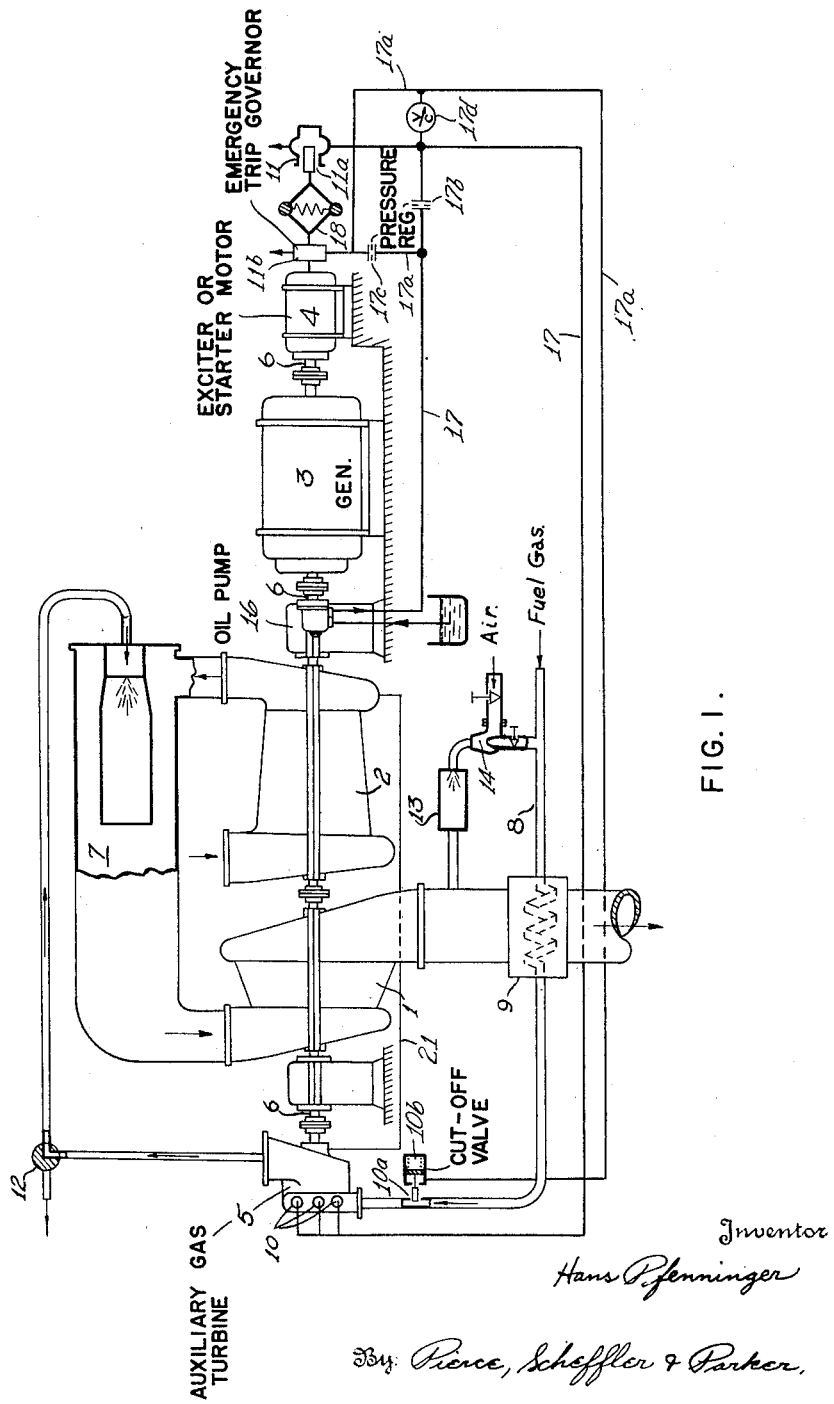

June 3, 1952   H. PFENNINGER   2,599,480
GAS TURBINE POWER PLANT HAVING AUXILIARY TURBINE DRIVEN BY
FUEL GAS BEING SUPPLIED TO THE COMBUSTION CHAMBER
Filed April 2, 1947   2 SHEETS—SHEET 2
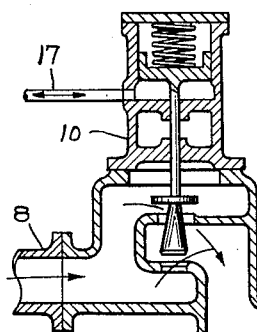
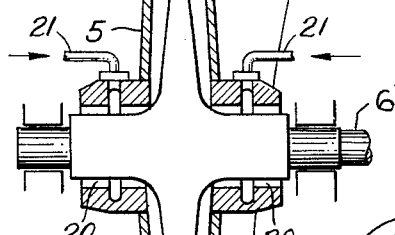
Fig. 2.
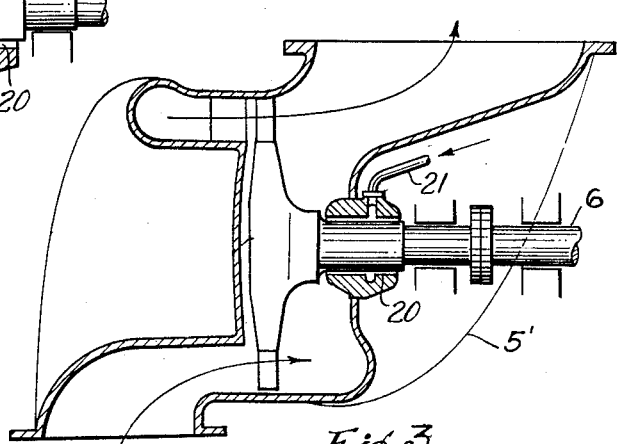
Fig. 3.
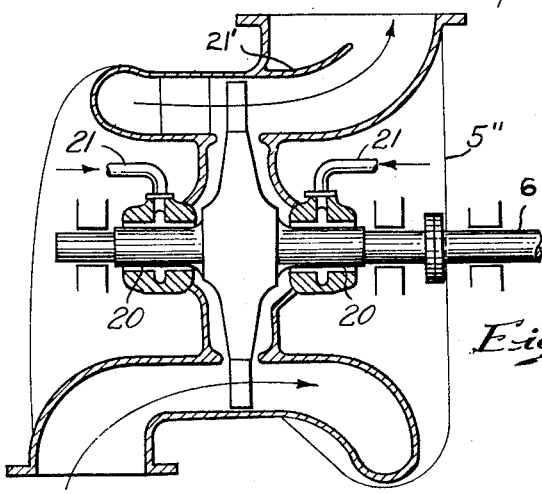
Fig. 4.
INVENTOR
Hans Pfenninger
BY Pierce, Scheffler & Parker
ATTORNEYS Patented June 3, 1952

2,599,480

UNITED STATES PATENT OFFICE 2,599,480

GAS TURBINE POWER PLANT HAVING AUXILIARY TURBINE DRIVEN BY FUEL GAS BEING SUPPLIED TO THE COMBUSTION CHAMBER

Hans Pfenninger, Baden, Switzerland, assignor to Aktiengesellschaft Brown, Boveri & Cie, Baden, Switzerland, a joint-stock company Application April 2, 1947, Serial No. 739,017
In Switzerland April 3, 1946

5 Claims. (Cl. 60—39.14)

Power plants operated on compressed gas are already known in which the combustion chamber or the gas producer is operated at the pressure of the fuel gas or the air or both considered together. These mediums may be compressed at the place where the combustion takes place, but it is also possible to conduct the fuel gas in an already compressed state to the place where it is to be consumed. The first method, for example, is utilized in steam producing plants that are fired with compressed gas or in heat engines driven directly by compressed gas, whereas the latter method is usually employed in power plants operated on natural gas.

The present invention, in contrast thereto, deals with a power plant operated by compressed gas under conditions where the pressure of the fuel gas supplied to the plant is greater than that which is required or necessary in the combustion chamber of the power plant. The gas, for example natural gas as obtained in nature, issues from the earth at a much higher pressure than that at which, when suitably stored, it is to be used in a heat engine plant. This is a situation usually encountered in the chemical industries, e. g. in petroleum recovery work where efforts are made to utilize natural gas for the production of power. The natural gas obtained as a by-product in petroleum recovery operations is often available under high pressure (up to 60 atmospheres). If it is desired to burn this gas, containing up to 80% of methane, in the furnace of a power plant, it must first be reduced to the pressure usually employed in the furnace. If the power plant is driven for example by a gas turbine, the pressure in the combustion chamber of such gas turbine is usually not greater than 3 to 12 atmospheres. The pressure of the fuel gas must therefore be reduced to this pressure. If the fuel gas is throttled down, a large portion of the potential energy contained therein becomes lost.

The present invention relates to an apparatus for solving this problem. In accordance with the invention, such gas, prior to being burned in the combustion chamber of a power plant, is first expanded to reduce its pressure down to the pressure of said combustion chamber, this being effected in an expansion engine interposed ahead of said combustion chamber. In this manner the great pressure gradient inherent in the natural gas may once and for all be brought effectively down to the degree suitable for permitting exploitation of its energy in the power plant per se. However, since gases such as natural gas issue from the earth at a temperature of as low as 20° to 40° C., they become intensely cooled when subjected to such expansion and the ice formed as a consequence thereof is apt to interrupt the operation of the expansion engine interposed ahead of the power plant. It is therefore preferable to heat such gases prior to effecting their expansion. The waste exhaust gases of the power plant are preferably utilized for this purpose.

In the accompanying drawings, Fig. 1 is a somewhat diagrammatic illustration of a combustion gas turbine power plant incorporating a preferred embodiment of the invention; Fig. 2 is a central section through the auxiliary turbine of the power plant and its control valve; and Figs. 3 and 4 are central sections illustrating modified constructions for the auxiliary turbine.

Referring now to the drawings and in particular to Figs. 1 and 2, the improved power plant is seen to include a gas turbine element 1, a compressor 2, a main electrical power generator 3, an auxiliary dynamoelectric machine 4 which may serve as an exciter for generator 3 or as a starter motor for the gas turbine and compressor units, and an expansion engine 5 in the form of a gas turbine, all of these components being arranged axially in line and driven by, or driving, as the case may be, a common shaft 6. The combustion chamber for the gas turbine 1 is designated by numeral 7, and the natural gas, prior to its combustion in combustion chamber 7 of the power plant, is expanded in the gas turbine 5 from its initially high pressure to the pressure prevailing in and required by combustion chamber 7.

The natural gas which may issue from the interior of the earth at a very high pressure of about 60 atmospheres, for example, is supplied by pipe 8. The combustion chamber 7 is usually operated at a pressure of 3 to 12 atmospheres, produced by the air compressor 2 of the gas turbine power plant. The expansion of the natural gas to the aforesaid low pressures is effected in the gas turbine 5 interposed ahead of the power plant per se, said gas turbine being directly supplied by the nautral gas. The expanded gas is then led to combustion chamber 7 where it is mixed with compressed air from compressor 2 and then ignited. The propelling gases thus produced serve to drive the gas turbine 1 which, together with the generators 3 and 4 and the necessary air compressor 2, constitute the power plant per se. In order to prevent the expansion of the natural gas in the turbine 5 from causing the already low temperature of the natural gas (20° to 40° C.) to drop below the dewpoint and hence cause breakdowns due to the formation of ice in the turbine, it is preferable to heat the natural gas in a preheater 9 by means of the exhaust gases from the turbine 1 before initiating its expansion. The exhaust waste gases from the gas turbine 1, after passing through the preheater 9, are then allowed to escape into the atmosphere. Preheating of the natural gas also serves to increase the expansion efficiency of the turbine 5 interposed ahead of the power plant and further serves to assure the proper gas temperature that is required for effecting combustion in the combustion chamber 7. Regulation of the quantity of fuel gas required is preferably effected by causing the fuel inlet valves 10 of the expansion turbine 5 to regulate the quantity of fuel gas in accordance with the load. While various types of governors may be adopted to automatically regulate the fuel inlet valves 10 in accordance with the load so that the rate of the fuel flow will increase with an increase in load and vice versa, the preferred arrangement, and which is illustrated schematically in the drawing, operates on hydraulic principles. The governor system includes an oil pump 16 driven from a power take-off from shaft 6 and which delivers oil at substantially constant pressure to a distribution line 17, an oil escape valve 11 in the distribution line 17, and a ball type governor 18 driven at load speed and which regulates the rate at which oil is permitted to escape through valve 11. The greater the discharge rate through valve 11, the lower the oil pressure in line 17 and vice versa. Line 17 extends to the valves 10 at the gas inlet side of the auxiliary turbine 5. These valves are conventional in construction, being spring loaded to a closed position and opened by a counter force variable with the oil pressure in line 17. Thus the greater the pressure in line 17, the greater will be the valve opening and vice versa. Operation of the governor system should now be quite obvious. If, for example, the plant load should increase, the speed of the output shaft 6 would tend to drop off. This results in a movement of the gate 11a in valve 11 to the right thus reducing the rate at which the oil escapes through the valve, which is reflected as an increase in pressure in the oil line 17 at valves 10. Thus the valves 10 move to a new and more open position with the result that the rate at which the fuel flows through the auxiliary turbine 5 and to the combustion chamber 7 is increased and hence produces the required increase in power necessary to meet the new increased load condition. In the event that the plant load should decrease, which would be reflected by a momentary increase in speed, the opposite effect would take place and valves 10 would be caused to move toward a more closed position and thus reduce the rate of fuel flow through the auxiliary turbine 5 and into the combustion chamber 7. Regulation of the quantity of fuel gas by means of the inlet valves of the expansion turbine serves substantially to avoid any losses such as would be caused by throttling the gas and which losses for example would result if the quantity of fuel gas supplied were to be regulated by means of throttling devices associated with the combustion chamber of the power producing engine per se.

In the interest of preventing any damage to the apparatus should the speed reach a dangerously high level an emergency fuel cut-off is provided. Concerning the latter, it will be observed from the drawing that oil pump 16 delivers pressure oil not only to the main distribution line 17 of the main governing system described above but also to an auxiliary distribution line 17a of the emergency cut-off system which latter is comprised of an emergency trip governor 11b and a cut-off valve 10a the operation of which is controlled by the oil pressure acting against a spring loaded piston 10b, and which valve is interposed in the fuel conduit 8 ahead of the fuel valves 10 on turbine 5.

Diaphragms for adjusting the respective oil pressures in the main and emergency distribution systems are indicated by reference numerals 17b and 17c. A check valve, interconnected between the two systems and allowing a flow of oil from the main governing system into the emergency cut-off system in the event of high over-speed but never allowing any flow in the opposite direction is shown at 17d. The emergency cut-off system operates as follows:

During normal operating conditions, the oil pressure in the emergency cut-off system remains practically constant and is approximately as high as the oil pressure at the outlet of pump 16 whereas the oil pressure in the main governing system will fluctuate in accordance with the load, as previously explained, and is always lower than the pump pressure due to the variable bleeding action of valve 11a. Hence under such conditions, the emergency valve 10a will be maintained in its open position thus allowing free flow of the fuel gas to the fuel regulating valves 10. Should, however, the speed of the power plant rise above a selected maximum safe value, the emergency trip governor 11b will then operate to allow free escape of oil therethrough thereby dropping the pressure in the emergency oil system 17a to practically zero which then permits the spring loaded piston 10b to move valve 10a to its fully closed position, thus shutting off the flow of fuel to turbine 5 and combustion chamber 7. Furthermore, the oil pressure in the main governing system being now momentarily higher than that in the emergency cut-off system, the check valve 17d allows a flow of oil from the former into the latter causing the governing oil pressure to likewise drop to zero and all the regulating valves 10 likewise move to a fully closed position. By thus doubly obturating fuel admission to turbine 5, a high degree of safety is obtained.

As illustrated it is preferable to couple the expansion engine 5 directly with the shaft 6 of the main power plant components and hence also to use turbine 5 as a starter for the combustion gas turbine plant. Due to the short starting period involved, it is usually unnecessary to preheat the fuel gas prior to effecting its expansion since the heat retaining capacity of the constructional materials of which the expansion turbine is built will, during such starting period, adequately serve to prevent excessive cooling and the formation of ice consequently thereon.

It is preferable, during the first stage of the starting procedure (i. e. while the gas turbine plant, driven by the expansion of the high pressure fuel gases in turbine 5, runs up to about 25 percent of its normal speed), to exhaust the expanded fuel gases discharging from the said expansion turbine directly into the atmosphere through two-way valve 12, so that no accumulation of explosive gases will be formed in the combustion chamber 7. After that, the flow of gas may be directed to combustion chamber 7 by turning valve 12 to the position shown in the drawing, and after the high pressure gas stream has been ignited, the plant will run up to full speed on account of the joint action of the driving energy gained from turbine 5 and that gained from turbine 1.

In case it should be desired during the starting procedure to feed the fuel gas in preheated condition to the turbine 5 that serves as the power plant starter, a small combustion chamber 13 can be installed ahead of the fuel gas preheater 9 in the outlet pipe of main gas turbine 1 and fuel gas fed to this auxiliary combustion chamber 13 from the natural gas pipe 8 via an injector 14 that supplies air for combustion, the air being drawn in by suction by the gas passing through the injector. The burned gas-air mixture is conducted from the auxiliary combustion chamber 13 to the preheater 9.

It is not desirable to heat the natural gas ahead of the expansion turbine 5 as by direct combustion thereof, since, for that purpose it would be necessary to compress the combustion air to the same pressure as that of the natural gas and this would require a separate air compressor adapted to compress the air to the high pressure possessed by the gas. In addition, such an arrangement would require an extraneous source of power.

In order to prevent leakage of the expanded gases from the shaft seal of the expansion turbine 5, the latter may be constituted as a single bearings structure 5' as shown in Fig. 3 so as to preclude all possibility of leakage at the inlet end of the turbine rotor. At the outlet end of the rotor, the pressure of the gas, during the starting period, is approximately equal to that of the ambient surroundings so that the danger of leakage is small if the shaft is well sealed. It is also possible to use an expansion turbine 5'' as shown in Fig. 4 having a diffuser 21' at the outlet of the turbine rotor blades adapted to keep the pressure at the shaft seal even lower than the atmospheric pressure. If the pressure drop in the expansion turbine is suitably moderate, a single crown impulse rotor may be used, as illustrated in Fig. 3. In such cases the gas pressure in the rotor casing at the inlet end of the turbine rotor would also, during the starting period, be approximately equal to the atmospheric pressure. As soon as the combustion gas turbine 1 has been started, the blower 2 serves to supply sealing air for all of the shaft seals 20 through pipe 21.

I claim:

1. In a power plant, the combination comprising a main gas turbine, a compressor mechanically coupled to said turbine, a combustion chamber, the outlet of said compressor being connected to said combustion chamber, and the latter being connected to the inlet of the main turbine, an auxiliary gas turbine mechanically coupled to said main turbine and compressor, adjustable valve means at the gas inlet to said auxiliary turbine for controlling the gas flowing through said turbine from a source of gaseous fuel having a delivery pressure higher than the operating pressure of said combustion chamber, pipe connections between the outlet from said auxiliary turbine and said combustion chamber, valve means in said pipe connections for selectively exhausting the fuel gas to atmosphere to facilitate plant starting by said auxiliary turbine, and means responsive to plant load for adjusting said gas inlet valves at said auxiliary turbine to regulate the rate at which fuel gas is delivered to said auxiliary turbine.

2. A power plant as defined in claim 1 wherein said auxiliary turbine is of the single-bearing type to facilitate sealing thereof.

3. A power plant as defined in claim 1 wherein said auxiliary turbine is of the single-bearing type having a single crown impulse rotor.

4. A power plant as defined in claim 1 wherein said auxiliary turbine is of the type having a single crown impulse rotor and a diffuser at the outlet side of said rotor to effect a drop in gas pressure within the turbine housing below that of atmosphere thereby preventing gas leakage losses at the shaft packing.

5. A power plant as defined in claim 1 and which further includes a heat exchanger in the outlet of said main turbine through which the fuel gas is passed for preheating by the turbine exhaust gases, an auxiliary combustion chamber, means for delivering a portion of the fuel gas to said auxiliary combustion chamber for combustion thereof, and means connecting the outlet of said auxiliary combustion chamber with the outlet of said main turbine so that the combustion gases produced in said auxiliary combustion chamber pass in heat transfer relation with said heat exchanger.

HANS PFENNINGER.

REFERENCES CITED

The following references are of record in the file of this patent:

UNITED STATES PATENTS

| Number | Name | Date |
| --- | --- | --- |
| Re. 22,844 | Traupel | Feb. 18, 1947 |
| 338,028 | Bower | Mar. 16, 1886 |
| 691,788 | Lundell | Jan. 28, 1902 |
| 734,220 | Bryan et al. | July 21, 1903 |
| 1,887,633 | Geiger | Nov. 15, 1932 |
| 1,978,837 | Forsling | Oct. 30, 1934 |
| 2,095,984 | Holzwarth | Oct. 19, 1937 |
| 2,115,338 | Lysholm | Apr. 26, 1938 |
| 2,154,481 | Vorkauf | Apr. 18, 1939 |
| 2,231,912 | Holzwarth | Feb. 18, 1941 |
| 2,298,663 | Traupel | Oct. 13, 1942 |
| 2,318,905 | Traupel | May 11, 1943 |
| 2,322,987 | West | June 29, 1943 |
| 2,341,490 | Traupel | Feb. 8, 1944 |
| 2,390,959 | Pfenninger | Dec. 11, 1945 |
| 2,392,783 | Stevens | Jan. 8, 1946 |
| 2,394,253 | Nettel et al. | Feb. 5, 1946 |
| 2,401,285 | Woodward et al. | May 28, 1946 |
| 2,418,911 | Smith | Apr. 15, 1947 |
| 2,419,689 | McClintock | Apr. 29, 1947 |

FOREIGN PATENTS

| Number | Country | Date |
| --- | --- | --- |
| 6,880 | Great Britain | June 5, 1885 |